US012639447B2

(12) United States Patent
Napper et al.

(10) Patent No.: US 12,639,447 B2
(45) Date of Patent: May 26, 2026

(54) SYSTEMS AND METHODS TO MAP ATTACK PATHS TO APPLICATIONS ASSETS IN A VISUALIZATION INTERFACE

(71) Applicant: Cisco Technology, Inc., San Jose, CA (US)

(72) Inventors: Jeffrey M. Napper, Delft (NL); Hendrikus G. P. Bosch, Aalsmeer (NL); Jean Diaconu, Gaillard (FR); Marcelo Yannuzzi, Nuvilly (CH); Alessandro Duminuco, Milan (IT); Guillaume Sauvage De Saint Marc, Sevres (FR); Marc Scibelli, Trumbull, CT (US)

(73) Assignee: Cisco Technology, Inc., San Jose, CA (US)

( * ) Notice: Subject to any disclaimer, the term of this patent is extended or adjusted under 35 U.S.C. 154(b) by 415 days.

(21) Appl. No.: 18/330,214

(22) Filed: Jun. 6, 2023

(65) Prior Publication Data

US 2024/0265112 A1 Aug. 8, 2024

Related U.S. Application Data

(60) Provisional application No. 63/483,133, filed on Feb. 3, 2023.

(51) Int. Cl.
*G06F 21/57* (2013.01)
*G06F 9/451* (2018.01)

(52) U.S. Cl.
CPC ............ *G06F 21/577* (2013.01); *G06F 9/451* (2018.02); *G06F 2221/033* (2013.01)

(58) Field of Classification Search
None
See application file for complete search history.

(56) References Cited

U.S. PATENT DOCUMENTS 9,256,739 B1    2/2016  Roundy et al.
11,444,974 B1 *  9/2022  Shakhzadyan ...... H04L 63/1466
(Continued)

OTHER PUBLICATIONS

Somak Bhattacharya, S. K. Ghosh, "An Attack Graph Based Risk Management Approach of an Enterprise LAN," Journal of Information Assurance and Security 2, © Dynamic Publishers, Inc., Jun. 5, 2008.

*Primary Examiner* — Syed A Roni
(74) *Attorney, Agent, or Firm* — Baker Botts L.L.P.

(57) ABSTRACT

A system and a method to map attack paths in a visualization interface may include storing in a memory asset inventory indicating application assets, attack vector parameters configured to indicate vulnerabilities of one or more of the application assets, and asset mapping information. A processor may determine multiple vulnerable assets in the application assets based at least in part upon the attack vector parameters. Further, the processor may obtain security parameters from a security framework indicating one or more attack techniques, associate each of the vulnerable assets to one or more of the security parameters, and generate a visual interface showing the vulnerable assets and the security parameters. The processor may determine an attack path connecting the vulnerable assets based at least in part upon the asset mapping information, and map the attack path to the application layers and the security parameters in the visual interface.

20 Claims, 7 Drawing Sheets

(56) References Cited

U.S. PATENT DOCUMENTS

| 2017/0169230 | A1* | 6/2017 | Zheng | .................... G06N 20/00 |
| 2017/0346839 | A1 | 11/2017 | Peppe et al. | |
| 2020/0137104 | A1 | 4/2020 | Hassanzadeh et al. | |
| 2021/0021629 | A1* | 1/2021 | Dani | ................... H04L 63/1433 |
| 2022/0159033 | A1 | 5/2022 | Mizrahi et al. | |
| 2022/0311798 | A1 | 9/2022 | Dani et al. | |
| 2023/0205891 | A1* | 6/2023 | Yellapragada | ...... H04L 63/1416 |
| | | | | 726/25 |

* cited by examiner

VISUALIZATION INTERFACE
600

| Technique | MITRE ATT&CK tactic | Attack type | Severity |
|---|---|---|---|
| External IP | Initial Access | Access Promotion | Medium |
| Security Group sg-07 | Resource Development | Access Promotion | High |
| EC2 instance | Persistence | Access Promotion | Medium |
| *Role* | *Access Promotion* | *Access Promotion* | *High* |
| RDS | Discovery | Access Promotion | Medium |
| *Admn Access* | *Access Promotion* | *Access Promotion* | *High* |
| Shodan search | Reconnaissance | Ransomware attack | Low |
| Jenkins install | Initial Access | Ransomware attack | High |
| API keys | Credential access | Ransomware attack | High |
| S3 publicly accessible | Initial Access | Ransomware attack | Medium |
| Auth to S3 | Initial Access | Ransomware attack | Low |
| Ransomware | Impact | Ransomware attack | High |
| No password required | Initial Access | Cryptomining | High |
| Deploy container | Execution | Cryptomining | Low |
| Cryptomining | Impact | Cryptomining | High |

FIG. 6

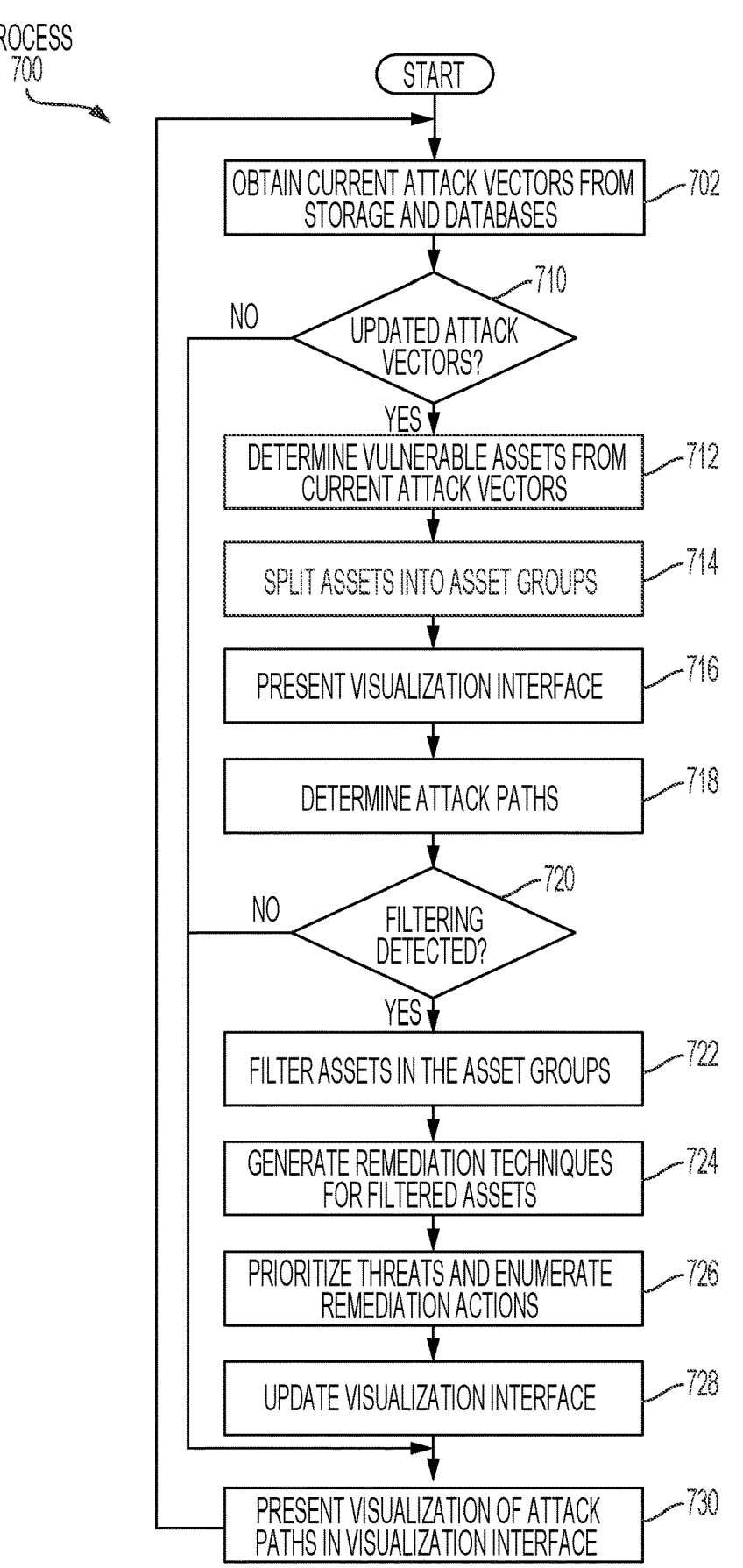

PROCESS
700

START

OBTAIN CURRENT ATTACK VECTORS FROM
STORAGE AND DATABASES — 702

710
UPDATED ATTACK
VECTORS?

NO

YES

DETERMINE VULNERABLE ASSETS FROM
CURRENT ATTACK VECTORS — 712

SPLIT ASSETS INTO ASSET GROUPS — 714

PRESENT VISUALIZATION INTERFACE — 716

DETERMINE ATTACK PATHS — 718

720
FILTERING
DETECTED?

NO

YES

FILTER ASSETS IN THE ASSET GROUPS — 722

GENERATE REMEDIATION TECHNIQUES
FOR FILTERED ASSETS — 724

PRIORITIZE THREATS AND ENUMERATE
REMEDIATION ACTIONS — 726

UPDATE VISUALIZATION INTERFACE — 728

PRESENT VISUALIZATION OF ATTACK
PATHS IN VISUALIZATION INTERFACE — 730

FIG. 7

SYSTEMS AND METHODS TO MAP ATTACK PATHS TO APPLICATIONS ASSETS IN A VISUALIZATION INTERFACE

TECHNICAL FIELD

The present disclosure relates generally to a field of application asset protection, and more particularly, to a system and a method to map attack paths to application assets in a visualization interface.

BACKGROUND

Application assets (e.g., application data and application resources) are at risk of being exploited by bad actors. In some cases, data used by an application may be corrupted by these bad actors to destabilize security safeguards in one or more layers of the application. The corrupted data may be used by the bad actors to modify or copy assets in the application. The impact of attacks caused by these actors in the application cannot be understood or visualized using previous technologies.

BRIEF DESCRIPTION OF THE DRAWINGS

For a more complete understanding of the present disclosure and for further features and advantages thereof, reference is now made to the following description taken in conjunction with the accompanying drawings, in which:

FIG. 6 illustrates a third visualization interface, according to some embodiments of the present disclosure; and FIG. 7 illustrates an example process for performing the operational flow of FIG. 2, according to some embodiments of the present disclosure.

DESCRIPTION OF EXAMPLE EMBODIMENTS

Overview

Figure 1:
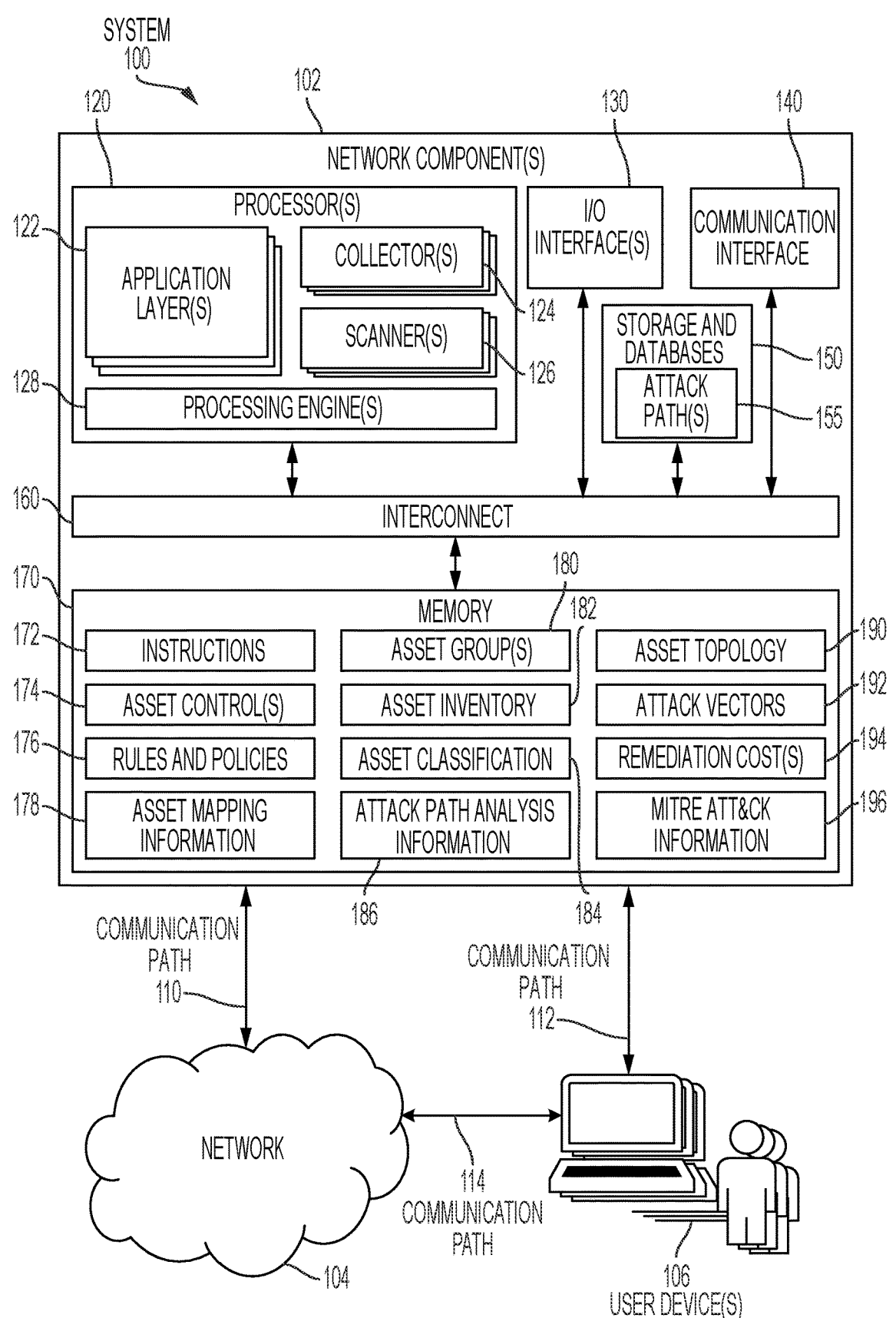
FIG. 1 illustrates an example system, according to some embodiments of the present disclosure.

In one or more embodiments, a system and a method described herein map attack paths to application assets across multiple application layers of an application in a visualization interface while providing a comprehensive understanding of vulnerabilities across the application layers. The system and the method prevent application assets (e.g., application data and application resources) from being at risk of being exploited by bad actors. In some embodiments, the system and the method may prevent data used by an application from being corrupted by these bad actors to destabilize security safeguards in one or more layers of the application. In other embodiments, the system and the method may prevent bad actors from modifying or copying assets in the application. In this regard, the impact of potential attacks by these actors is drastically reduced in the application because the system and the method provide understanding and visualization of vulnerabilities across the application layers in attack paths.

In some embodiments, the system and the method may generate a visual representation of vulnerable assets of a multi-layered application. The visual representation may map the vulnerable assets in an attack path comprising one or more indicators associating the vulnerable assets with one another and remediations for preventing attacks via the attack path. Further, the visual representation may provide multiple indicators that show a level of priority of a vulnerable asset in the attack path and remediation costs of each vulnerable asset. In other embodiments, the system and the method comprise more processors implementing an attack path filtering engine. The system and the method may comprise visualizing and prioritizing attack paths. The system and the method may split assets into groups and generate groupings of shared data assets and shared elements of attack vectors. The system and the method may generate a visual representation of attack paths. The system and the method may further generate selectable assets within the visual representation and filter certain vulnerable assets from the selectable assets. The system and the method may generate remediation techniques for the filtered assets.

In other embodiments, the system and the method may identify and report vulnerable assets in the visual interface based at least in part upon one or more attack vectors. Herein, the term attack vector refers to an entry point of bad actors in a given application layer in a multi-layer application. The system and the method may identify a source of one or more vector attacks in an attack path and incorporate one or more indicators of the source in the visual representation of the attack path. In the visual representation, the indicators may show a likely tactic or technique that may be used by bad actors to generate specific vector attacks. To prevent bad actors from compromising possible vulnerable assets impacted by a specific vector attack in a given attack path, the system and the method may assign a security and safety identifier associated with an attack type affecting corresponding vulnerable assets, and a level of severity of the specific vector attack in the multi-layer application.

In one or more embodiments, the system and the method may present the visual representation as a graph or diagram of application services and sensitive assets. In accordance with certain embodiments, the system and the method may identify and show one or more threats to an application within one or more application layers. In this regard, the system and the method provide multiple parameters indicative of any threats that may be exploited and intertwined by bad actors to gain access to sensitive assets. Further, the system and the method provide insights in the visual representation to determine the relation among the vulnerable assets. In cases comprising larger number of potential attack paths (e.g., in organizations comprising several hundreds or thousands of assets), the system and the method may determine threats that are most critical in accordance with one or more priority information. For example, the priority information may indicate that certain assets should be prioritized to provide the largest reduction in vulnerabilities in a given attack path.

In accordance with one or more embodiments, a system or an apparatus, such as a network component, includes a memory and a processor communicatively coupled to one another. The system may map attack paths in to application assets in a visualization interface. The memory may store asset inventory indicating application assets, first attack vector parameters that indicate vulnerabilities of one or more of the application assets, and asset mapping information that associates each of the application assets to one or more of the application layers. The processor may determine first vulnerable assets in the application assets based at least in part upon the first attack vector parameters, obtain first security parameters from a security framework indicating one or more attack techniques, and associate each of the first vulnerable assets to one or more of the first security parameters. Further, the processor may generate a visual interface showing the first vulnerable assets and the first security parameters, determine a first attack path connecting the first vulnerable assets based at least in part upon the asset mapping information, and map the first attack path to the application layers and the first security parameters in the visual interface.

In some cases, in conjunction with determining the first attack path connecting the first vulnerable assets, the processor may obtain multiple user visualization commands from a user device and map the first attack path to the application layers and the first security parameters in the visual interface based at least in part upon the user visualization commands.

In certain cases, the processor may further obtain second attack vector parameters, and determine second vulnerable assets in the application assets based at least in part upon the second attack vector parameters. Further, the processor may obtain second security parameters from the security framework, associate each of the second vulnerable assets to one or more of the second security parameters, and update the visual interface showing the first vulnerable assets, the first security parameters, the second vulnerable assets, and the second security parameters. The processor may determine a second attack path connecting the second vulnerable assets based at least in part upon the asset mapping information, and map the second attack path to the application layers and the second security parameters in the visual interface.

In some cases, in conjunction with determining the first vulnerable assets, the processor may further determine a first remediation cost to remove the first vulnerable assets from the first attack path. Further, in conjunction with determining the second vulnerable assets, the processor may further determine a second remediation cost to remove the second vulnerable assets from the second attack path. The processor may update the visual interface showing the first remediation cost and the second remediation cost.

In yet other cases, the processor may obtain asset protection information indicating a first risk tolerance level for the first attack path and a second risk tolerance level for the second attack path. Further, the processor may compare the first remediation cost to the first risk tolerance level, and in response to the first remediation cost being greater than the first risk tolerance level, generate first threat prioritization parameters that indicate first corresponding priorities for each vulnerable asset in the first vulnerable assets. The processor may generate first remediation parameters that indicate a first solution to remediate the first attack path in the system, assign the first threat prioritization parameters and the first remediation parameters to the first attack path in the visual interface, and compare the second remediation cost to second first risk tolerance level. In response to the second remediation cost being greater than the second risk tolerance level, the processor may generate second threat prioritization parameters that indicate second corresponding priorities for each vulnerable asset in the second vulnerable assets, generate second remediation parameters that indicate a second solution to remediate the second attack path in the system, and assign the second threat prioritization parameters and the second remediation parameters to the second attack path in the visual interface.

In some embodiments, the processor may generate first threat visualization parameters that indicate first corresponding attack types and first corresponding attack severity for each vulnerable asset in the first vulnerable assets, and assign the first threat visualization parameters to the first attack path in the visual interface.

In one or more embodiments, the application layers comprise an application data layer, an application logic layer, an application infrastructure layer, and an application cloud infrastructure layer. Further, the first attack vector parameters comprise a comprehensive list of attack vectors. Additionally, the first attack vector parameters comprise information indicating vulnerabilities and potential intrusions in the application layers.

In accordance with other embodiments, a method comprises mapping attack paths to application assets in a visualization interface. The method may comprise obtaining parameters comprising asset inventory indicating multiple application assets, first attack vector parameters configured to indicate vulnerabilities of one or more of the application assets, and asset mapping information configured to associate each of the application assets to one or more of application layers. Further, the method comprises determining first vulnerable assets in the application assets based at least in part upon the first attack vector parameters, obtaining first security parameters from a security framework, the first security parameters indicating one or more attack techniques, and associating each of the first vulnerable assets to one or more of the first security parameters. The method comprises generating a visual interface showing the first vulnerable assets and the first security parameters, determining a first attack path connecting the first vulnerable assets based at least in part upon the asset mapping information, and mapping the first attack path to the application layers and the first security parameters in the visual interface.

In accordance with yet other embodiments, a non-transitory computer readable medium stores instructions that when executed by a processor cause the processor to map attack paths to application assets in a visualization interface. The instructions may further cause the processor to obtain parameters comprising asset inventory indicating multiple application assets, first attack vector parameters configured to indicate vulnerabilities of one or more of the application assets, and asset mapping information configured to associate each of the application assets to one or more application layers. Further, the instructions may cause the processor to determine first vulnerable assets in the application assets based at least in part upon the first attack vector parameters, obtain first security parameters from a security framework, the first security parameters indicating one or more attack techniques, and associate each of the first vulnerable assets to one or more of the first security parameters. The instructions may cause the processor to generate a visual interface showing the first vulnerable assets and the first security parameters, determine a first attack path connecting the first vulnerable assets based at least in part upon the asset mapping information, and map the first attack path to the application layers and the first security parameters in the visual interface.

Technical advantages of certain embodiments of this disclosure may include one or more of the following. The system and the method described herein map attack paths to application assets associated with one or more application layers in a multi-layer application. Specifically, the system and the method provide scalable attack path visualization and prioritization. In certain embodiments, the systems and method described herein generate visual representations of attack paths and critical attack vectors to relevant attackable assets. In some embodiments, the system and the method described herein enable users (e.g., a development, security, and operations user, a chief information security officer (CISO), a chief security officer (CSO), and the like) to rapidly understand non-trivial challenges in application data security, such as how different threats present in a multi-layer application are intertwined and exploited by bad actors to gain access to sensitive assets (e.g., confidential data). In some embodiments, the system and the method described herein may be used to gain insights and visualize such threats in a simple and digestible manner at scale (e.g., even within dense application service topologies). In some embodiments, the system and the method described herein may be used to understand which threats are most critical and approaches to solve them.

In addition, the system and the method described herein are integrated into a practical application of increasing processing speed and reducing memory usage in the system. Specifically, the system and the method improve response speed and accuracy of communication with user devices. For example, a technical advantage of one embodiment may allow for improved reliability in real-time communications between user devices and a network component in which the application comprises one or more assets. In another example, another technical advantage of one embodiment may identify critical threats detected by the attack path analysis, prioritize these threats, and provide detailed guidance enabling remediation actions to mitigate, reduce, or eliminate the threats. These are particularly important to prevent, reduce, or eliminate coordinated cyberattacks.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
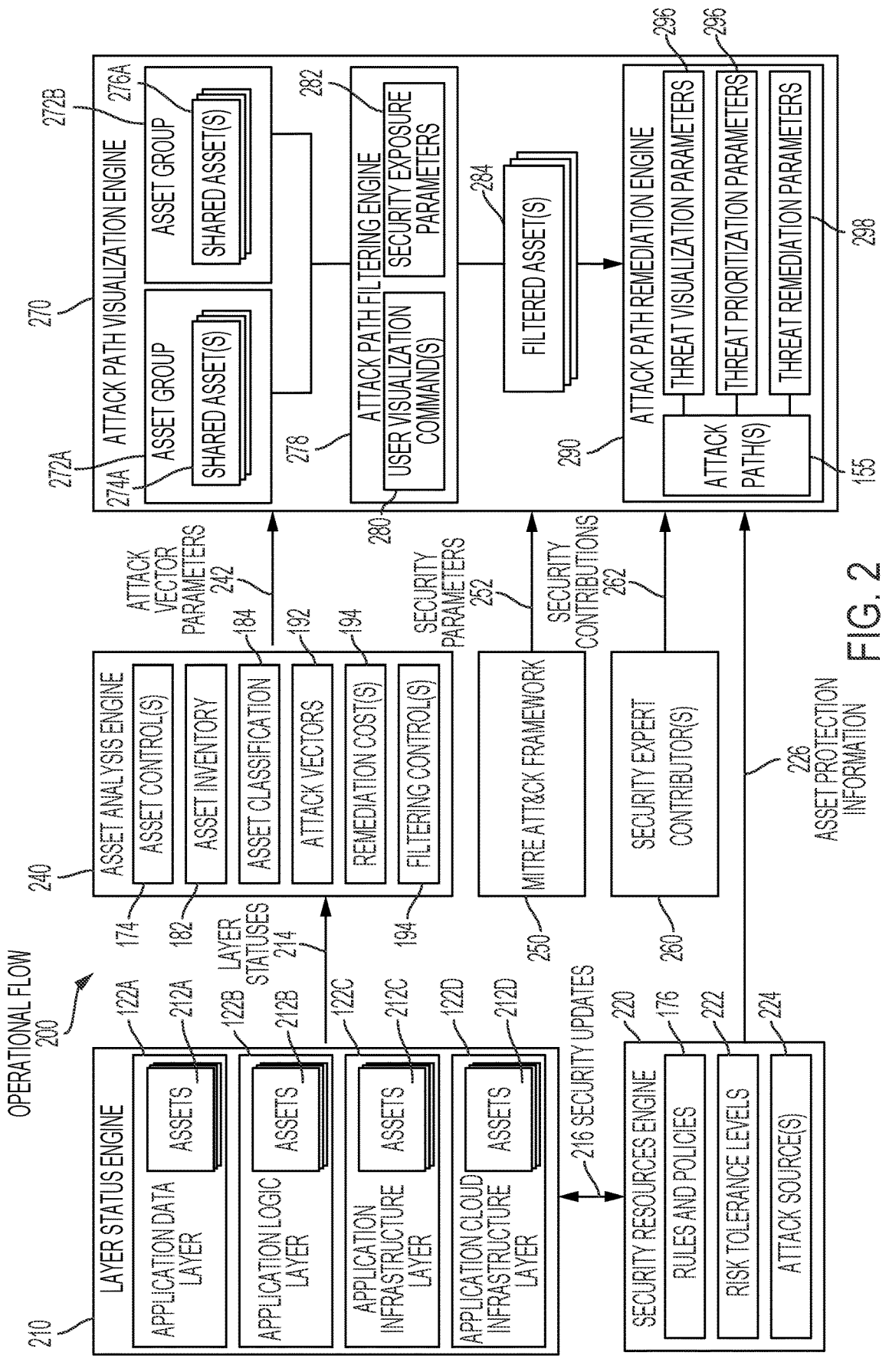
FIG. 2 illustrates an example operational flow of the system of FIG. 1, according to some embodiments of the present disclosure.
Figure 3:
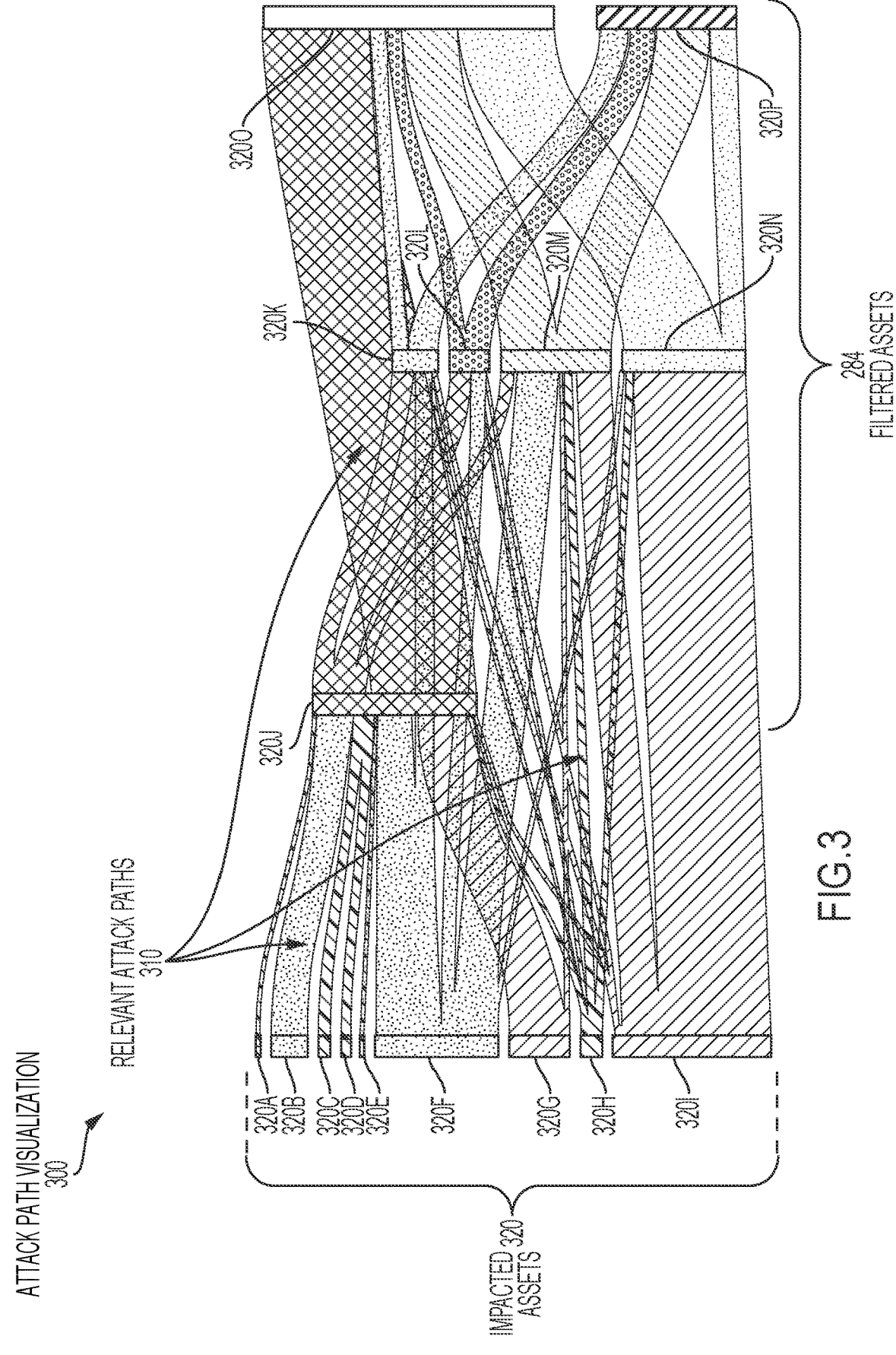
FIG. 3 illustrates an attack path visualization, according to some embodiments of the present disclosure.
Figure 4:
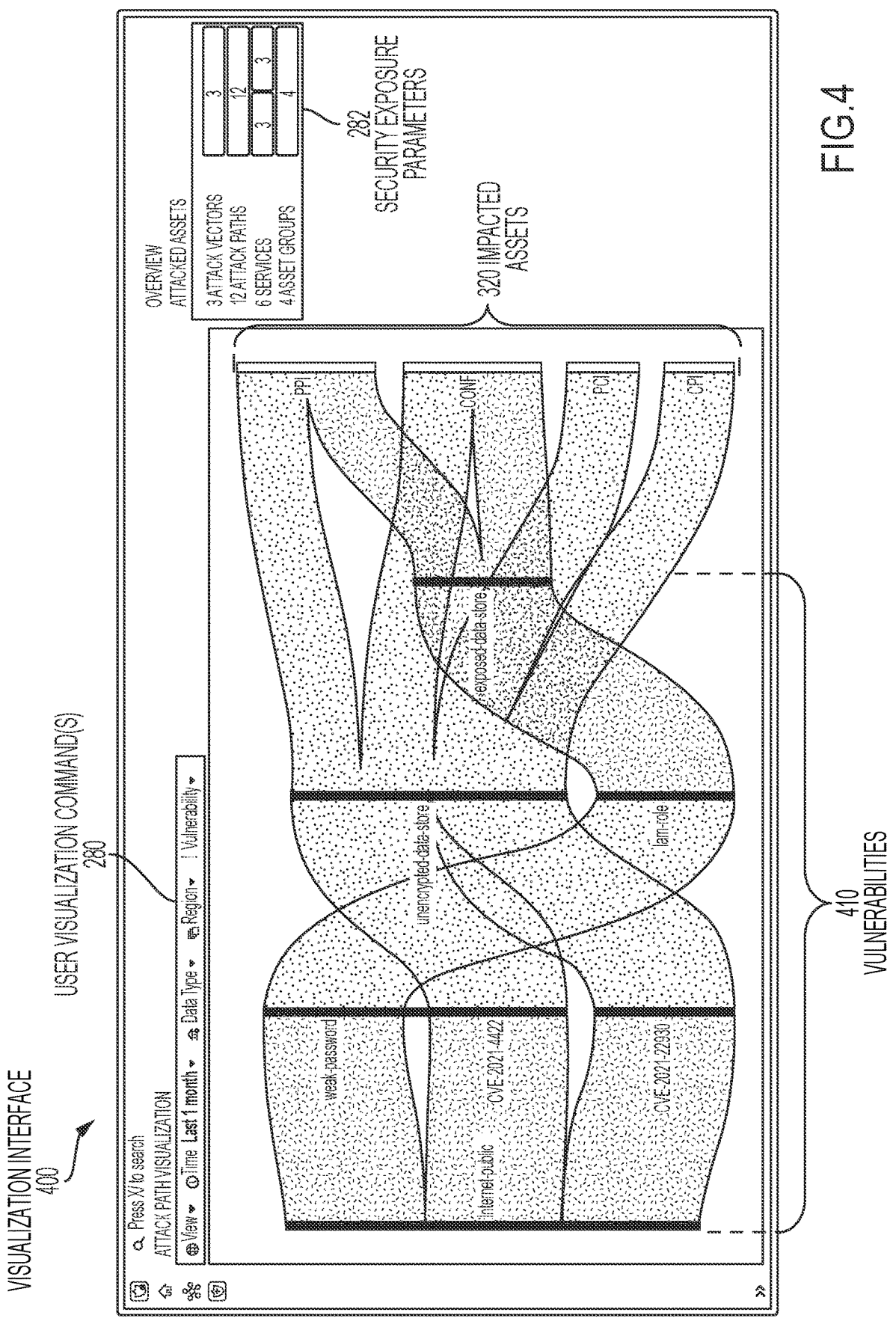
FIG. 4 illustrates a first visualization interface, according to some embodiments of the present disclosure.
Figure 5:
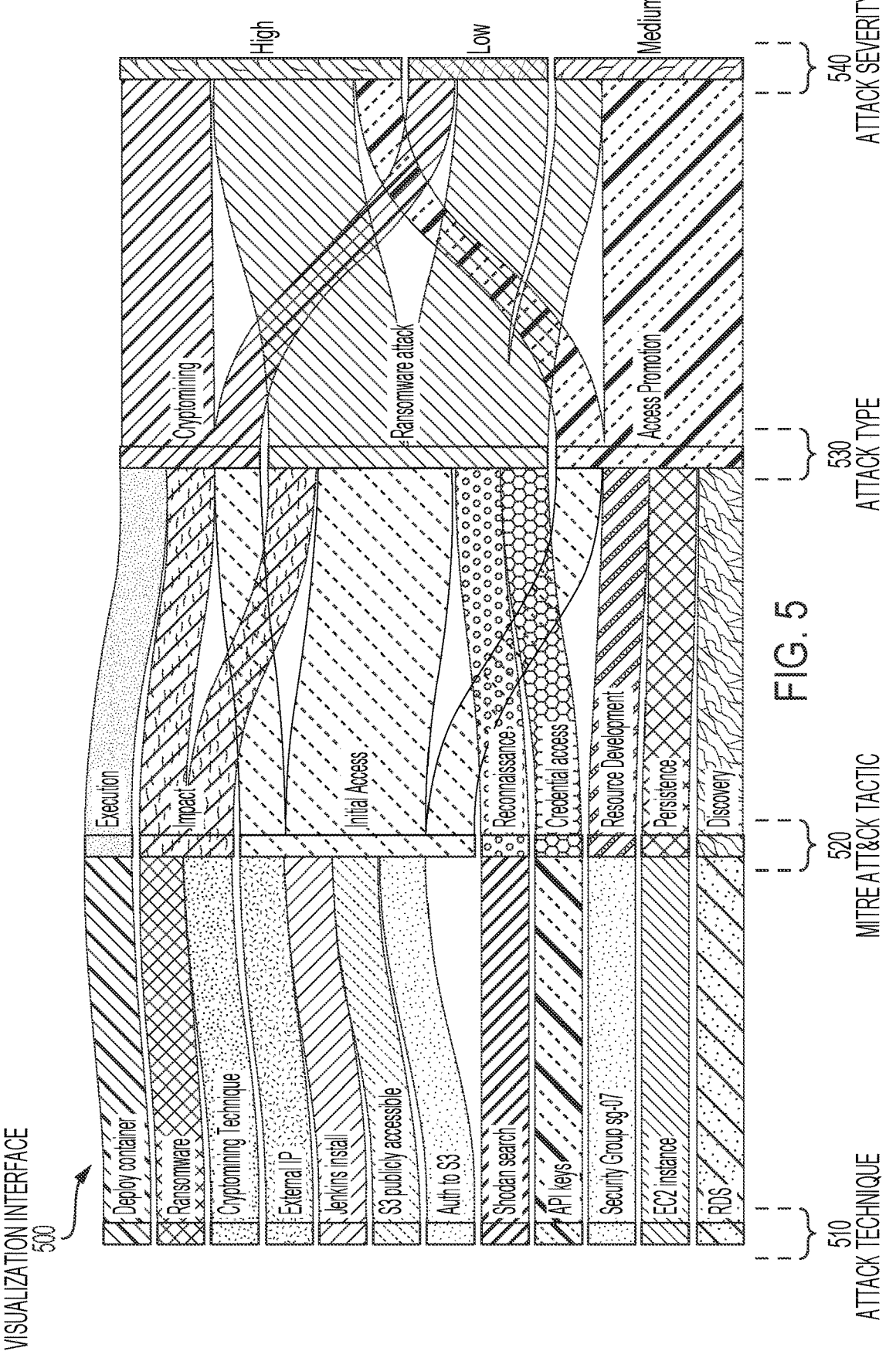
FIG. 5 illustrates a second visualization interface, according to some embodiments of the present disclosure.

This disclosure describes systems and methods to map attack paths to application assets in a visualization interface. In particular, this disclosure provides various systems and methods to provide visualization of unsanctioned access to vulnerable assets of a multi-layered application structure to reduce, prevent, or eliminate attack vectors. FIG. 1 illustrates a system 100 in which one or more application layers 122 are analyzed to determine one or more attack paths 155 to application assets. FIG. 2 illustrates an operational flow 200 in which the system 100 of FIG. 1 is configured to implement an attack path remediation engine 290. FIG. 3 illustrates an attack path visualization 300 showing results of the operational flow 200 of FIG. 2. FIGS. 4-6 illustrate respective visualization interfaces 400-600 in which embodiments of the attack path visualization 300 of FIG. 3 are shown. FIG. 7 illustrates a process 700 to perform the operational flow 200 of FIG. 2.

FIG. 1 illustrates a system 100 configured to map attack paths 155 to application assets, in accordance with one or more embodiments. The application assets may be configured as part of an application that routes control commands and data signals among at least one network component 102, one or more client devices 106, and a network 104. In the system 100 of FIG. 1, the network component 102, the one or more client devices 106, and the network 104 are communicatively coupled to one another via multiple communication paths 110-114. For example, FIG. 1 shows that: the network component 102 and the network 104 are connected to one another via the communication path 110; the network component 102 and the one or more client devices 106 are connected to one another via the communication path 114, and the network 104 and the one or more client devices 106 are connected to one another via the communication path 114. The communication paths 110-114 may be wired or wireless connections among the at least one network component 102, the one or more client devices 106, or the network 104. In one or more embodiments, the network component 102 may be a hardware chassis configured to control data flow. The network component 102 may be configured to regulate data packet transmissions in the communication path 110 or the communication path 114. The communication paths 110-114 may include multiple bandwidth levels in which control signals and data signals may be transmitted using one or more communication protocols.

In one or more embodiments, the network 104 and the one or more client devices 106 may be a source or a destination for data packet transmissions monitored or controlled by one or more processors 120. In this regard, the communication interface 140 receives or transmits data packet transmissions exchanged with the network 104 via the communication path 110 and exchanged with the one or more client devices 106 via the communication path 112. The network component 102 may include the one or more processors 120, a memory 170, an input (I)/output (O) interface 130, a communication interface 140, and storage and databases 150 connected to one another via an interconnect 160. The network component 102 may be a computer system used to provide routing and assignment of resources during data packet transmissions. In one or more embodiments, one or more memory elements (e.g., the memory 170) may be shared by the one or more processors 120 in the network component 102. The one or more processors 120 in the network component 102 may be adapted to perform basic and advanced packet counting and forwarding operations. Although this disclosure describes and illustrates a particular network component 102 having a particular number of particular components in a particular arrangement, this disclosure contemplates any suitable network component 102 or computer system having any suitable number of any suitable components in any suitable arrangement.

In some embodiments, the network component 102 may take any suitable physical form. As example and not by way of limitation, the network component 102 may be an embedded computer system, a system-on-chip (SOC), a single-board computer (SBC) system (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, a router device, or a combination of two or more of these. Where appropriate, the network component 102 may include one or more computer systems; be unitary or distributed; span multiple locations; span multiple machines; span multiple data centers; or reside in a cloud, which may include one or more cloud components in one or more networks. Where appropriate, one or more computer systems may perform without substantial spatial or temporal limitation one or more steps of one or more methods described or illustrated herein. As an example, and not by way of limitation, the network component 102 may perform in real-time or in batch mode one or more steps of one or more methods described or illustrated herein. The network component 102 may perform at different times or at different locations one or more steps of one or more methods described or illustrated herein, where appropriate.

In some embodiments, the one or more processors 120 includes hardware for executing instructions, such as those making up a computer program. As an example, and not by way of limitation, to execute instructions, the one or more processors 120 may retrieve (or fetch) the instructions from an internal register, an internal cache, or the memory 170; decode and execute them; and then write one or more results to an internal register, an internal cache, or the memory 170. Specifically, the one or more processors 120 may include one or more internal caches for data, instructions, or addresses. This disclosure contemplates the one or more processors 120 including any suitable number of internal caches, where appropriate. As an example, and not by way of limitation, the one or more processors 120 may include one or more instruction caches, one or more data caches, and one or more translation lookaside buffers (TLBs). Instructions in the instruction caches may be copies of instructions 172 in the memory 170, and the instruction caches may speed up retrieval of those instructions by the one or more processors 120. Data in the data caches may be copies of data in the memory 170 for instructions executing at the one or more processors 120 to operate on via one or more processing engines 128; the results of previous instructions executed at the one or more processors 120 for access by subsequent instructions executing at the one or more processors 120 or for writing to the memory 170; or other suitable data. The data caches may speed up read or write operations by the one or more processors 120. The TLBs may speed up virtual-address translation for the one or more processors 120. In particular embodiments, the one or more processors 120 may include one or more internal registers for data, instructions, or addresses. This disclosure contemplates the one or more processors 120 including any suitable number of suitable internal registers, where appropriate. Where appropriate, the one or more processors 120 may include one or more arithmetic logic units (ALUs); be a multi-core processor; or include one or more additional one or more processors 120. Although this disclosure describes and illustrates a particular processor, this disclosure contemplates any suitable processor.

In one or more embodiments, the one or more processors 120 include hardware, software executed by hardware, or a combination of both, providing one or more service components to route and assign resources for data packet transmissions. The one or more processors 120 may include access to the one or more application layers 122, one or more collectors 124, one or more scanners 126, and one or more processing engines 128 communicatively coupled to one another or interconnected via a transmission bus (not shown, but similar to the interconnect 160 described below). The one or more processors 120 may be a routing device configured to route resources in the network 104 to the one or more client devices 106. In some embodiments, the one or more processors 120 may be included on a same card or die. In this regard, the access to the application layers 122 may comprise one or more access to multiple assets 123 performing one or more operations in an application. The application layers 122, the collectors 124, and the scanners 126 are described in reference to FIG. 2. The collectors 124 and the scanners 126 may be configured to retrieve one or more asset parameters from the one or more application layers 122. The asset parameters may comprise information indicating monitored statuses for each of the application layers 122. The collectors 124 and the scanners 126 may be centralized or distributed (e.g., deployed under control of asset owners, application controls, or application management). In some embodiments, collectors 124 and the scanners 126 support continuous scanning and/or collection capability both in an active mode and a passive mode. In one example, the asset parameters may be signals collected or scanned during one or more run time environments (e.g., active mode). In another example, the asset parameters may be signals collected by importing files (e.g., passive mode) or through application programming interfaces (APIs). In yet another example, the asset parameters may be signals obtained in multiple ways, such as by scanning via a plugin interface or collected via an upload process or operation.

In other embodiments, the one or more processing engines 128 may be software executed by hardware and configured to map attack paths to application assets based at least in part on the asset parameters obtained from the application layers 122. The one or more processing engines 128 is described in more detail in reference to FIG. 2. The one or more processing engines 128 may be implemented by the one or more processors 120 operating as specialized hardware accelerators. The one or more processing engines 128 may be configured to implement networking-specific processing tasks in custom logic and achieve better performance than typical software implementations. For example, the one or more processing engines 128 may be lookup engines (e.g., using specialized logic), cryptographic coprocessors, content inspection engines, and the like. In some embodiments, the one or more processing engines 128 comprise a layer status engine 210, a security resources engine 220, an asset analysis engine 240, an attack path visualization engine 270, and an attack path remediation engine 290.

In one or more embodiments, the I/O interface 130 comprises hardware, software executed by software, or a combination of both, providing one or more interfaces for communication between the network component 102 and one or more I/O devices. The network component 102 may include one or more of these I/O devices, where appropriate. One or more of these I/O devices may enable communication between a person and the network component 102. As an example, and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any suitable I/O interfaces 130 for them. Where appropriate, I/O interface 130 may include one or more device or software drivers enabling the one or more processors 120 to drive one or more of these I/O devices. The I/O interface 130 may include one or more I/O interfaces 130, where appropriate. Although this disclosure describes and illustrates a particular I/O interface 130, this disclosure contemplates any suitable I/O interface 130.

In one or more embodiments, the communication interface 140 includes hardware, software executed by hardware, or a combination of both providing one or more interfaces for communication (such as, for example, packet-based communication) between the network component 102, the one or more client devices 106, the network 104, or one or more additional networks. As an example, and not by way of limitation, the communication interface 140 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable corresponding communication interface 140. As an example, and not by way of limitation, the network component 102 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the network component 102 may communicate with a wireless PAN (WPAN) (such as, for example, a Bluetooth WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The network component 102 may include any suitable communication interface 140 for any of these networks, where appropriate. The communication interface 140 may include one or more communication interfaces 140, where appropriate. Although this disclosure describes and illustrates a particular communication interface, this disclosure contemplates any suitable communication interface.

In some embodiments, the storage and databases 150 may be communicatively coupled to the one or more processors 120, the I/O interfaces 130, the communication interfaces 140, and the memory 170. The storage and databases 150 may be a wired connection that shares an internal bandwidth for data packet transmissions inside the network component 102 with the memory 170. The storage and databases 150 may be configured with an internal buffering capacity and an internal memory speed. The internal buffering capacity may indicate a buffering capacity (in bytes) that the storage and databases 150 are capable of handling. For example, the internal buffering capacity may be 1,000 bytes. Further, the internal memory speed may indicate a processing speed (in bytes per second) at which the storage and databases 150 is capable of handling or buffering data packets. For example, the internal memory speed may be 1,000 bytes per second. The storage and databases 150 may comprise instructions and data memory for the one or more processors 120. In other embodiments, some portions of the memory are shared among the one or more processors 120 and the memory 170. The storage and databases 150 may comprise one or more attack paths 155 representative of a sequence of vulnerable assets 123 that an attack vector may follow to impact the integrity of the application. Each attack path of the attack paths 155 may be configured to provide visibility and understanding of vulnerable assets 123 across the multiple application layers 122.

In particular embodiments, the interconnect 160 includes hardware configured to couple components of the network component 102 to each other. As an example and not by way of limitation, the interconnect 160 may include an Accelerated Graphics Port (AGP) or a graphics bus, an Enhanced Industry Standard Architecture (EISA) bus, a front-side bus (FSB), a HyperTransport (HT) interconnect, an Industry Standard Architecture (ISA) bus, an InfiniBand interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The interconnect 160 may include one or more interconnect 160, where appropriate. Although this disclosure describes and illustrates a particular bus, this disclosure contemplates any suitable bus or interconnect.

The interconnect 160 may be one or more memory buses (which may each include an address bus and a data bus) that may couple the one or more processors 120 to the memory 170. In other embodiments, one or more memory management units (MMUs) reside between the one or more processors 120 and the memory 170 and facilitate accesses to the memory 170 requested by the one or more processors 120. In particular embodiments, the memory 170 includes random access memory (RAM). This RAM may be volatile memory, where appropriate. Where appropriate, this RAM may be dynamic RAM(DRAM) or static RAM(SRAM). Moreover, where appropriate, this RAM may be single-ported or multi-ported RAM. This disclosure contemplates any suitable RAM. The memory 170 may include one or more additional memories, where appropriate. Although this disclosure describes and illustrates particular memories, this disclosure contemplates any suitable memory or combination of suitable memories.

In particular embodiments, the memory 170 includes mass storage for data or instructions. As an example, and not by way of limitation, the memory 170 may include a hard disk drive (HDD), a floppy disk drive, flash memory, an optical disc, a magneto-optical disc, magnetic tape, or a Universal Serial Bus (USB) drive or a combination of two or more of these. The memory 170 may include removable or non-removable (or fixed) media, where appropriate. The memory 170 may be internal or external to a computer system, where appropriate. In particular embodiments, the memory 170 is non-volatile, solid-state memory. In particular embodiments, the memory 170 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates the memory 170 as a mass storage taking any suitable physical form. The memory 170 may include one or more storage control units facilitating communication between the one or more processors 120 and the memory 170, where appropriate. Although this disclosure describes and illustrates particular storage, this disclosure contemplates any suitable storage.

In one or more embodiments, the memory 170 includes a main memory for storing the instructions 172 for the one or more processors 120 to execute or data for the one or more processors 120 to operate on. As an example, and not by way of limitation, the network component 102 may load the instructions 172 from another memory in the network component 102. The one or more processors 120 may then load the instructions 172 from the memory 170 to an internal register or internal cache. To execute the instructions 172, the one or more processors 120 may retrieve the instructions 172 from the internal register or internal cache and decode them. During or after execution of the instructions 172, the one or more processors 120 may write one or more results (which may be intermediate or final results) to the internal register or internal cache. The one or more processors 120 may then write one or more of those results to the memory 170. In some embodiments, the one or more processors 120 executes only the instructions 172 in one or more internal registers or internal caches or in the memory 170 and operates only on data in one or more internal registers or internal caches or in the memory 170.

In one or more embodiments, the memory 170 includes commands or data associated with one or more specific applications in addition or as part of the instructions 172. In FIG. 1, the memory 170 comprises the one or more asset controls 174, multiple rules and policies 176, asset mapping information 178, asset groups 180, asset inventory 182, asset classification 184, attack path analysis information 186, asset topology 190, attack vectors 192, one or more remediation costs 194, and security and safety information 196. In some embodiments, the one or more asset controls 174 may be configured to provide one or more connectivity parameters to establish a connection between the one or more processors 120 and the application layers 122. The one or more asset controls 174 may be configured to provide access to assets 123 in the application layers 122. For example, the one or more asset controls 174 may be one or more preestablished commands that the collectors 124 and the scanners 126 may use to obtain the monitoring statuses from the application layers 122.

In some embodiments, the multiple rules and policies 176 may be information commanding rules and/or operations of the system 100. The rules and policies 176 may be updated dynamically or periodically over time. For example, the rules and policies 176 may provide guidelines to access, receive and transmit information using the network component 102. In other embodiments, the asset mapping information 178 comprises mapping tools that enables mapping of assets 123 in the application layers 122 when implemented by the one or more processors 120. The asset groups 180 may be information to find existing assets 123 in the application layers 122. The asset inventory 182 may be configured to provide information indicating names or identifiers for the assets 123 in the application layers 122. The asset classification 184 may be configured to provide relation information between the assets 123 and any corresponding application layers 122.

In one or more embodiments, the attack path analysis information 186 may be configured to provide attack path information generated via the one or more processing engines 128. In some embodiments, the attack path analysis information 186 is the basis to analyze the attack paths 155 and any corresponding impact to one or more assets 123 in the application layers 122. In other embodiments, the attack path analysis information 186 may be risk associated factors indicating a level or risk associated with any one segment of a specific attack path 155. In some embodiments, the asset topology 190 may be configured to associate assets 123 among one another. For example, the asset topology 190 may comprise relation information among one or more assets 123. The asset topology 190 may be dynamically modified based at least in part upon changes to operations or structures in the application layers 122 of the application.

In some embodiments, the attack vectors 192 may be configured to represent a sequence of vulnerabilities that may be exploited by bad actors (e.g., attackers or hackers) to gain access to application assets 123 in order to deliver a payload or a malicious outcome (e.g., exfiltrate data, ransomware, or cyberattacks against the application). Each vulnerability may be seen as an element of an attack vector 192. In certain embodiments, a vulnerability may be part of several attack vectors 192 (e.g., individual or coordinated attacks). The attack vectors 192 may be unencrypted data from data security posture management (DSPM). In other embodiments, the attack paths 155 are visual representations of specific chains of actions or events that may occur when the attack vectors 192 are exploited in a given application instance and configuration context. In some embodiments, the one or more remediation costs 194 may be configured to represent monetary or organizational impacts resulting from remediating unsanctioned access to the assets 123 to the application. The remediation costs 194 may be different or the same for different segments of a given attack path 155. Further, the remediation costs 194 may be different or the same for different attack paths 155. For example, a first attack path of the attack paths 155 may comprise multiple segments. In this case, each segment may comprise a corresponding remediation cost 194. The security and safety information 196 may be a database comprising knowledge of tactics and techniques designed for threat hunters, defenders and red teams to classify attacks, identify attack attribution and objectives, and assess risks for a given organization. In some embodiments, the given organization may use a framework to identify security gaps and prioritize mitigations based on the assessed risks.

The one or more asset controls 174, the rules and policies 176, the asset mapping information 178, the asset groups 180, the asset inventory 182, the asset classification 184, the attack path analysis information 186, the asset topology 190, the attack vectors 192, the remediation costs 194, and the security and safety information 196 may be configured to be used or updated as part of the operational flow 200 described in reference to FIG. 2.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In one or more embodiments, the network 104 may be a combination of electronic devices forming a multi-node mesh. As an example and not by way of limitation, one or more portions of the network 104 may include an ad hoc network, an intranet, an extranet, a virtual private network (VPN), a LAN, a wireless LAN (WLAN), a WAN, a wireless WAN (WWAN), a MAN, a portion of the Internet, a portion of the Public Switched Telephone Network (PSTN), a cellular technology-based network, a satellite communications technology-based network, another network 104, or a combination of two or more such networks 104.

In one or more embodiments, the one or more client devices 106 include end-user devices such as laptops, phones, tablets, and any other suitable device that are capable of receiving, creating, processing, storing, or communicating information, including data packet transmissions. The client devices 106 may comprise one or more network interfaces, at least one processor, and a memory that is interconnected by a system bus as well as a power supply. In some embodiments, the client devices 106 represents devices that are capable of receiving real-time data packet transmissions and may include general purpose computing devices (e.g., servers, workstations, desktop computers, and the like), mobile computing devices (e.g., laptops, tablets, mobile phones, and the like), wearable devices (e.g., watches, glasses, or other head-mounted displays (HMDs), ear devices, and the like), and so forth. The client devices 106 may also include Internet of Things (IoT) devices or equipment, such as agricultural equipment (e.g., livestock tracking and management systems, watering devices, unmanned aerial vehicles (UAVs), and the like); connected cars and other vehicles; smart home sensors and devices (e.g., alarm systems, security cameras, lighting, appliances, media players, Heating Ventilation, and Air Conditioning (HVAC) equipment, utility meters, windows, automatic doors, door bells, locks, etc.); office equipment (e.g., desktop phones, copiers, fax machines, and the like); healthcare devices (e.g., pacemakers, biometric sensors, medical equipment, and the like); industrial equipment (e.g., robots, factory machinery, construction equipment, industrial sensors, and the like); retail equipment (e.g., vending machines, point of sale (POS) devices, Radio Frequency Identification (RFID) tags, and the like); smart city devices (e.g., street lamps, parking meters, waste management sensors, and the like); transportation and logistical equipment (e.g., turnstiles, rental car trackers, navigational devices, inventory monitors, and the like); and so forth.

FIG. 2 shows an example operational flow 200 to map attack paths 155 to application assets 123 in a visualization interface, in accordance with one or more embodiments. The application assets 123 may be associated with one or more application layers 122 in the system 100 of FIG. 1. In FIG. 2, the operational flow 200 is performed by different components in the network component 102. In particular, the operational flow 200 may be performed using the one or more processors 120. As a non-limiting example, the communication interface 140 may be a source of data packet transmissions into the network component 102 via the communication path 110 and the communication path 112. The communication interface 140 may also transfer data packet transmissions outside from the network component 102 via the communication path 110 and the communication path 112. In some embodiments, the operational flow 200 is performed via implementation of the one or more processing engines 128, which may comprise a layer status engine 210, a security resources engine, an asset analysis engine 240, an attack path visualization engine 270, and an attack path remediation engine 284 communicatively coupled to one another. As described above, the layer status engine 210, the security resources engine, the asset analysis engine 240, the attack path visualization engine 270, and the attack path remediation engine 284 may be implemented via the one or more processors 120.

The layer status engine 210 may be configured to retrieve monitored statuses collected and scanned via the collectors 124 and the scanners 126, respectively. The collectors 124 and the scanners 126 may be configured to track vulnerabilities from the assets 123 in the application layers 122. In the example of FIG. 2, the collectors 124 and the scanners 126 monitor statuses of the assets 212A in the application data layer 122A; the assets 212B in the application logic layer 122B; the assets 212C in the application infrastructure layer 122C; and the assets 212D in the application cloud infrastructure layer 122D. The layer status engine 210 may be configured to establish one or more security updates 216 with the security resources engine 220. In this regard, the layer status engine 210 may be configured to provide layer statuses 214 to the asset analysis engine 240 based at least in part upon the security updates 216 established with the layer status engine 210.

In one or more embodiments, the security resources engine 220 comprises the rules and policies 176, one or more risk tolerance levels 222, and one or more attack sources 224. The security resources engine 220 may be configured to establish the security updates 216 with the layer status engine 210 based at least in part upon the rules and policies 176. The risk tolerance levels 222 may be configured to provide a tolerance permitted for a vulnerable asset 123 in the application. For example, the risk tolerance levels 222 may indicate a relevance of one or more assets 123 to the overall application or to one of the application layers 122. The attack sources 224 may be indicative of possible starting points for one or more of the attack vectors 192. In some embodiments, the security resources engine 220 may be configured to provide asset protection information 226 to the attack path visualization engine 270 based at least in part upon the security updates 216 established with the layer status engine 210. The asset protection information 226 may comprise the risk tolerance levels 222 in association with one or more of the attack sources 224. The asset analysis engine 240 may be configured to generate multiple attack vector parameters 242 based at least in part upon the asset controls 174, the asset groups 180, the asset inventory 182, the asset classification 184, the attack vectors 192, and the remediation costs 194.

The attack path visualization engine 270 may be configured to map attack paths to one or more of the application assets. The attack path visualization engine 270 may receive the attack vector parameters 242 from the asset analysis engine 240, one or more security parameters 252 from a MITRE ATT&CK framework 250, one or more security contributions 262 from one or more security expert contributors 260, and the asset protection information 226 from the security resources engine 220. The attack vector parameters 242 may be configured to indicate vulnerabilities of one or more of the application assets. The attack path visualization engine 270 may comprise the attack path filtering engine 278 and the attack path remediation engine 290.

The MITRE ATT&CK framework 250 may be associated with MITRE ATT&CK®, which stands for MITRE Adversarial Tactics, Techniques, and Common Knowledge (ATT&CK). The MITRE ATT&CK framework 250 is a curated knowledge base and model for cyber adversary behavior, reflecting various phases of attack lifecycles and attack targets for bad actors. The MITRE ATT&CK framework 250 may provide a common taxonomy of individual adversary actions by both offensive and defensive sides of cybersecurity. Further, the security contributions 262 may comprise information for identifying tactics and techniques such as reconnaissance, resource development, initial access, execution, persistence, privilege escalation, defense evasion, credential access, discovery, lateral movement, collection, command and control, exfiltration and impact tactics and techniques. As non-limiting examples, the reconnaissance tactics and techniques may involve bad actors actively or passively gathering information that could be used to support targeting. The resource development tactics and techniques may involve bad actors creating, purchasing, or compromising/stealing resources that could be used to support targeting. The initial access tactics and techniques may comprise gaining initial footholds within the network 104 via targeted spearphishing and exploiting weaknesses on public-facing assets 123. The execution tactics and techniques may comprise adversary-controlled code running on a local or a remote system paired with techniques from all other tactics to achieve broader goals, like exploring a network or stealing data. The persistence tactics and techniques may comprise techniques that bad actors may use to keep access to systems across restarts, changed credentials, and other interruptions that could cut off access to the bad actors. The privilege escalation tactics and techniques may comprise bad actors attempting to gain higher-level permissions on a system or network. The defense evasion tactics and techniques may be comprise bad actors attempting to avoid detection throughout attacks. The credential access tactics and techniques may comprise bad actors stealing attempting to steal credentials or access information like account names and passwords. The discovery tactics and techniques may comprise bad actors attempting to gain knowledge about internal architectures of systems and networks. The lateral movement tactics and techniques may comprise bad actors that attempt to enter and control remote systems on a network. The collection tactics and techniques may comprise bad actors attempting to gather information from the application. The command and control tactics and techniques may comprise bad actors that communicate with systems under a guise of management and control. The exfiltration tactics and techniques may comprise bad actors attempting to steal data from the application. The impact tactics and techniques may comprise bad actors attempting to disrupt availability or compromise integrity of operational processes in the application.

The security expert contributors 260 may be one or more contributions from security organizations comprising expertise in the areas of application defense and cybersecurity among others. The security expert contributors 260 may be configured to provide additional insight to application security operations based at least in part ongoing advances in cybersecurity applications. Further, the one or more security parameters 252 may be one or more commands to implement in the attack path visualization engine 270.

In the example of FIG. 2, the attack path visualization engine 270 may be configured to determine and update the attack paths 155 to vulnerable application assets 132. The application layers 122 may comprise an application data layer 122A, an application logic layer 122B, an application infrastructure layer 122C, and an application cloud infrastructure layer 122D. In some embodiments, the rules and policies 176 may comprise application security solutions, and one or more trusted entities (e.g., Common Vulnerabilities and Exposures (CVEs)) among one or more additional source. The asset analysis engine 240 may further comprise a data discovery module (e.g., a managed and/or unmanaged data stores), asset classification modules, asset inventory modules, risk quantification tools (e.g., as represented in currency), and access from on-call security experts.

In one or more embodiments, the attack path visualization engine 270 may provide visualization and prioritization of the attack paths 155, in accordance with certain embodiments. As a non-limiting example, the attack path visualization engine 270 may split the application assets 123 into asset group 272A and asset group 272B (collectively, asset groups 272) comprising shared assets 274A and shared assets 274B (collectively, shared assets 274), respectively. In some embodiments, the shared assets 274 may be a combination of one or more of the application assets 123 distributed in one or more of the application layers 122. The asset groups 272 may be created based at least in part upon the attack vector parameters 242. In particular, the attack path visualization engine 270 may split the application assets 123 into asset groups 272 corresponding to vulnerable assets in a given attack path 155. In some embodiments, the shared assets 274A and the shared assets 274B may comprise the same or different application assets 123. In particular, while these asset groups 272 may represent two different attack paths 155, the asset groups 272 may comprise one or more of the same vulnerable assets 123.

In one or more embodiments, the application assets 123 may be split into groups (e.g., personally identifiable information (PII), Payment Card Industry (PCI), health-care data, specific data, and the like) and across storage elements (e.g., cloud elements, on-premise elements, in-app storage, or the like). The asset groups 272 of shared assets 274 may correspond to any generated attack vectors. For example, the asset groups 272 may comprise similar or different shared assets 274 and shared elements of attack vectors 192.

In some embodiments, the attack paths 155 described in reference to FIG. 1 are generated in a visual representation (e.g., a graph, a diagram, a flowchart, or the like). The attack paths 155 may comprise access to storage (e.g., bad cloud-storage credentials), or indirect access (e.g., a container with direct storage access, a virtual machine (VM) with application programming interface (API) excessive data exposure, and the like). At this stage, the attack path filtering engine 276 may be configured to itemize one or more selectable assets based at least in part upon the shared assets 274. At this stage, users (e.g., via one or more of the user devices 106 or one or more of the I/O interfaces 130) may select a group of asset groups 272 to determine additional details on any of the shared assets 274, risks and costs associated with a given application asset 123, a corresponding attack vector 192 (e.g., precise vulnerabilities or potential intrusions), the corresponding attack path 155 (e.g., comprising steps to be taken by possible attackers or bad actors to succeed in such intrusion), and the like.

In some embodiments, the attack path filtering engine 276 filters the shared assets 274 in accordance with one or more user visualization commands 278 and one or more security exposure parameters 280. The user visualization commands 278 may be filters controlled to deter mine one or more selections of the application assets 123. The security exposure parameters 280 may be determined based at least in part upon the security parameters 252, the security contributions 262, and the asset protection information 226. In other embodiments, the filtered assets 282 are generated for the selectable assets. For example, different kinds of filters may be applied during the asset selections leading to focused analysis and visualizations (e.g., per type of sensitive data, per data store, per region, per criticality or priority, to visualize attack paths 155 starting from intrusions at build time, at run time, and the like based at least in part upon the user visualization commands 278).

In one or more embodiments, the filtered assets 282 are received by the attack path remediation engine 284. The attack path remediation engine 284 may evaluate the attack paths 155 based at least in part upon the filtered assets 282. At this stage, the attack path remediation engine 284 may generate or determine one or more threat visualization parameters 286, one or more threat prioritization parameters 290, and one or more threat remediation parameters 292. The threat visualization parameters 286 may be configured to provide one or more visualization commands based at least in part upon the attack vector parameters 242. The threat visualization parameters 286 may modify the size or proportion of the filtered asset 282 in the visualization interface. The threat prioritization parameters 290 may be configured to assign risk tolerance levels 222 to each of the filtered assets 282 and determine an associated remediation cost 194 for each vulnerable asset in a given attack path 155. The threat remediation parameters 292 may comprise quarantining processing and storage elements, crafting Infrastructure as code (IaC) templates for data segregation, restricting API/management access to storage, and the like.

FIG. 3 shows an example attack path visualization 300, in accordance with one or more embodiments. In particular, the attack path visualization 300 comprise one or more relevant attack paths 310 showing multiple impacted assets 320 selected from the asset groups 272 of FIG. 2. In the example of FIG. 3, each strand shown may be correspond to an attack path 155. Further, while FIG. 3 shows a Sankey diagram, any suitable graph, diagram or flowchart may be used to represent the attack path visualization 300. In some embodiments, the attack path visualization 300 may be automatically generated as part of an attack path analysis by the attack path visualization engine 270. In certain embodiments, the attack path visualization 300 illustrates any impacted assets 320A-320P at risk, the relevant attack paths 310 attackers may take, or any relevant attack paths 155 prioritized for remediation. For example, certain strands in the attack path visualization 300 may be highlighted or texturized to represent a higher priority. In another example, more sensitive assets maybe positioned at the top of a column. The attack path visualization 300 may comprise the attack vectors 192 for a given application, any impacted assets 320 to be protected, and shared assets 274 of the attack vectors 192. In the example of FIG. 3, the impacted assets 320 comprise an impacted asset 320A, an impacted asset 320B, an impacted asset 320C, an impacted asset 320D, an impacted asset 320E, an impacted asset 320F, an impacted asset 320G, an impacted asset 320H, an impacted asset 320I, an impacted asset 320J, an impacted asset 320K, an impacted asset 320L, an impacted asset 320M, an impacted asset 320N, an impacted asset 320O, and an impacted asset 320P. As a non-limiting example, the impacted assets 320A-320I may be indicative of one or more of the attack vectors 192 such that these assets 123 may be vulnerable assets to be used as an entry point to the application layers 122.

In some embodiments, a height size of the bars representing the impacted assets 320 may reflect corresponding risk tolerance levels 222 on the impacted assets 320A-320P, while a width size of the bars may reflect a severity of a given asset vulnerability or a potential intrusion. As described above, an attack vector 192 represents a sequence of vulnerabilities that may be exploited by bad actors (e.g., attackers, hackers, and the like) to gain access to the application layers 122 in order to deliver a payload or a malicious outcome (e.g., exfiltrate data, ransomware, or other cyberattacks. Each vulnerable asset may be seen as an element of an attack vector. In some embodiments, a vulnerability may be part of several attack vectors. In some embodiments, an attack path 155 is a visual representation of a specific chain of actions or events that may occur when attack vectors 192 are exploited in a given application instance and configuration context.

The impacted assets 320 to be protected may include sensitive data such as PII, PCI, confidential data, and the like. The impacted assets 320 may be ordered by value, impact, and the like. The impacted assets 320 may represent central processing unit (CPU) assets, infrastructure assets, or application layer-specific assets. In certain embodiments, the impacted assets 320 may be split into the asset groups 272. For example, the impacted assets 320 may be split into PCI assets, PII assets, healthcare data assets, specific data assets, and the like. In some embodiments, the impacted assets 320 may be split across storage elements. For example, the impacted assets 320 may be split into cloud assets, on-premises assets, in-app storage assets, and the like.

As described above, the relevant attack paths 310 comprise access to storage (e.g., bad cloud-storage credentials), or indirect access (e.g., a container with direct storage access, a VM with API excessive data exposure, etc.). The impacted assets 320 may be selectable for additional details on one or more filtered assets 282 based at least in part upon one or more of the user visualization commands 278. For example, the user visualization commands 278 may comprise a selection that causes the attack path visualization 300 to determine additional details. The additional details may include risk tolerance levels 222 for the impacted assets 320, information on the attack vectors 192 (e.g., describing a precise vulnerability or potential intrusion), information on one of the relevant attack paths 310 (e.g., describing remediating operations to be taken by bad actors (e.g., attacker) to succeed in such intrusion), and the like.

In certain embodiments, the attack path filtering engine 276 generates the filtered assets 282 based at least in part upon the user visualization commands 278 and the security exposure parameters 280. The user visualization commands 278 and the security exposure parameters 280 may be filters that lead to more focused analysis and visualizations (e.g., per type of sensitive assets, per asset store, per region, per criticality or priority, and the like to visualize attack paths starting from intrusions at build time, at run time, and the like). In particular, in the attack path visualization 300, the filtered assets 282 may comprise the impacted assets 320J-320P. As described above, the location of the impacted assets in the attack path visualization 300 may indicate a level of severity of a risk level associated with each impacted asset 320.

In the example attack path visualization 300 of FIG. 3, given that impacted assets 320A-320I represent an entry point into the application layers 122, the impacted asset 320J may be a more severe and intermediate impacted asset that may be vulnerable based at least in part upon the access via impacted assets 320A-320I. In turn, the impacted assets 320K-320N may be may be yet more severe and further intermediate impacted assets that may be vulnerable based at least in part upon the access via impacted assets 320A-320I and the impacted asset 320J. The impacted asset 320K may indicate vulnerabilities based at least in part upon strand connections to the impacted assets 320A, 320F, 320H, 320I, and 320J. The impacted asset 320L may indicate vulnerabilities based at least in part upon strand connections to the impacted assets 320A, 320F, 320I, and 320J. The impacted asset 320M may indicate vulnerabilities based at least in part upon strand connections to the impacted assets 320F, 320H, 320I, and 320J. The impacted asset 320N may indicate vulnerabilities based at least in part upon strand connections to the impacted assets 320F, 320H, and 320I. At the end of the filtered assets 282 in the attack path visualization 300, the impacted assets 320O and 320P may represent the impacted assets 320 with a more severe still impact to the application layers 122. In this example, the impacted asset 320O is shown as being vulnerable via access through the impacted assets 320J, 320K, 320L, 320M, and 320N. The impacted asset 320P is shown as being vulnerable via access through the impacted assets 320K, 320L, 320M, and 320N.

In one or more embodiments, the attack path visualization 300 may provide one or more remediation techniques to reduce, prevent, or eliminate vulnerabilities associated with the impacted assets 320. The remediation techniques may include quarantining processing and storage elements, crafting IaC templates for data segregation, restricting API/management access to storage, and the like. Further, the attack path visualization 300 may comprise different types of representations and/or visualizations comprising three-dimensional (3D) diagrams, multi-layer visualizations, split views into risks and threats at build time, at run time or a merge of both, and the like.

As a practical non-limiting example, one or more embodiments described herein automatically generate the attack path visualization 300 based at least in part upon identifying a new threat to an application implemented in one or more devices (e.g., network component 102 or user devices 106) and exposes an API. In this example, an attacker may exploit a vulnerability (e.g., CVE 2021 22930) associated with the application. For example, the attacker may download a Java class that is inserted in deployment, allowing the attacker to run code in the network component 102 or one of the user devices 106. In this regard, the attacker may gain access to an unencrypted data store. Based at least in part upon determining attacker access to smaller risk assets, the attack path visualization 300 may be generated or updated to include an attack path 155 caused by the new access of the attacker. To this end, the attack path visualization may comprise a newer flow that originates on the left of the attack path visualization 300 and continues to impacted assets 320 on the right side of the attack path visualization 300. The vertical bars of the attack path visualization 300 may automatically change in size to visually represent costs associated with remediating vulnerabilities in the attack path 155. Once the vulnerabilities are remediated, the attack path visualization 300 may be automatically updated to remove any strands caused by the attacker in this instance.

FIG. 4 shows a visualization interface 400 comprising a representation of the attack path visualization 300, in accordance with one or more embodiments. Specifically, FIG. 4 illustrates an example embodiment of a security posture graph modified by one or more user visualization commands 278 indicating a view selection, a time selection, a data type selection, a region selection, and a vulnerability (e.g., risk tolerance level 222) selection. The visualization interface 400 comprises an overview of any impacted assets 320 and corresponding vulnerabilities 410, which are shown to comprise three attack vectors 192, twelve attack paths 155, six services, and four sensitive asset groups 272 or categories. In some embodiments, the visualization interface 400 may be generated based on a particular view, a particular time period (e.g., last 1 month), a data type, a region, a vulnerability, and the like.

In the visualization interface 400 of FIG. 4, the leftmost bar is shown to represent the public internet. Three subsequent bars to the right represent the following attack vectors: a weak password, CVE 2021-4422, and CVE 2021-22930, respectively. Two subsequent bars further to the right represent an unencrypted data store and an Identity and Access Management (IAM) role, respectively. A subsequent bar further to the right still represents exposed data store. The rightmost bars represent the following sensitive asset categories: PII, configuration data (CONF), PCI, and Customer Personally Identifiable Information (CPII), respectively.

FIG. 5 shows a visualization interface 500 comprising a representation of the attack path visualization 300, in accordance with one or more embodiments. Specifically, FIG. 5 illustrates an example embodiment of a security posture diagram modified by one or more user visualization commands 278 indicating a view selection, a time selection, a data type selection, a region selection, and a vulnerability (e.g., risk tolerance level 222) selection. The visualization interface 500 comprises an overview of any impacted assets 320 and corresponding vulnerabilities 410, which are shown to comprise twelve attack vectors 192 and thirty attack paths 155. In some embodiments, the visualization interface 400 may be generated based on a particular view, a particular time period (e.g., last 1 month), a data type, a region, a vulnerability, and the like. The visualization interface 500 may comprise twelve attack techniques 510, eight MITRE ATT&CK tactics 520, three attack types 530, and three severity levels 540.

In the visualization interface 400 of FIG. 4, the leftmost bar is shown to represent the attack techniques 510 comprising: deploy container, ransomware, cryptomining techniques, external IP, Jenkins install, S3 public accessible, Auth to S3, Shodan search, API keys, security group sg-07, EC2 instance, and RDS, respectively. Eight subsequent bars to the right represent the following MITRE ATT&CK tactics 520: execution, impact, initial access, reconnaissance, credential access, resource development, persistence, and discovery, respectively. Three subsequent bars further to the right represent attack types 530 comprising: cryptomining, ransomware attack, and access promotion, respectively. The rightmost bars represent the following attack severity levels 540: high severity, low severity, and medium severity, respectively.

FIG. 6 shows a visualization interface 600 comprising a representation of the attack path visualization 300, in accordance with one or more embodiments. Specifically, FIG. 6 illustrates an example embodiment of a security posture diagram modified by one or more user visualization commands 278 indicating a view selection, a time selection, a data type selection, a region selection, and a vulnerability (e.g., risk tolerance level 222) selection. The visualization interface 600 comprises an overview of any impacted assets 320 and corresponding vulnerabilities 410, which are shown to comprise fifteen attack vectors 192. In some embodiments, the visualization interface 600 may be generated based on a particular view, a particular time period (e.g., last 3 month), a data type, a region, a vulnerability, and the like. The visualization interface 600 may comprise fifteen attack techniques 510, nine MITRE ATT&CK tactics 520, three attack types 530, and three severity levels 540.

In the visualization interface 600 of FIG. 6, the leftmost column is shown to represent the attack techniques 510 comprising: external IP, security group sg-07, EC2 instance, role, RDS, admin access, Shodan search, Jenkins install, API keys, S3 publicly accessible, auth to S3, ransomware, no password required, deploy container, and cryptomining, respectively. The subsequent column to the right represents the following MITRE ATT&CK tactics 520: execution, impact, initial access, reconnaissance, credential access, resource development, persistence, and discovery, respectively. The subsequent column further to the right represent attack types 530 comprising: access promotion, ransomware attack, and cryptomining, respectively. The rightmost column represent the following attack severity levels 540: high severity, low severity, and medium severity, respectively. The columns may be toggled ON or OFF dynamically or on demand in the visualization interface 600.

In some embodiments, the visualization interfaces 400-600 may show different bars at different sizes based at least in part upon one or more filtering parameters (e.g., the user visualization commands 278 and the security exposure parameters 280). The visualization interfaces 400-600 show attack flows (e.g., multiple attack paths or a coordinated set of attack paths) comprising vulnerable assets 123 in the multi-layer application. Further, the visualization interfaces 400-600 map the attack paths 155 detected in the application layers 122. To understand the risk to an application, the visualization interfaces 400-600 provide identification in a diagram or table form comprising attacks that are most impactful, and observe precise operations (e.g., methods or processes) are used by attackers to get into the application layers 122 relative to protected assets or severity. Although FIGS. 4-6 illustrate particular designs or number of elements in the respective visualization interfaces 400-600, this disclosure contemplates any suitable number of elements and visualization operations. Although FIGS. 4-6 illustrate particular arrangement of the elements of the attack path visualization 300, this disclosure contemplates any suitable arrangement of the elements. Furthermore, although FIGS. 4-6 describe and illustrate particular components, devices, or systems carrying out particular actions, this disclosure contemplates any suitable combination of any suitable components, devices, or systems carrying out any suitable actions. For example, in some embodiments, the attack path visualization may be toggled between any one of the visualization interfaces 400-600 based at least in part upon one or more user visualization commands 278.

FIG. 7 shows an example flowcharts of a process to map attack paths to application assets associated with one or more application layers in a multi-layer application, in accordance with one or more embodiments. Modifications, additions, or omissions may be made to the process 700. The process 700 may include more, fewer, or other operations than those shown below. For example, operations may be performed in parallel or in any suitable order. While at times discussed as the network component 102, the one or more processors 120, or components of any of thereof, any suitable system or components of the system 100 may perform one or more operations of the process 700. For example, one or more operations of process 700 may be implemented, at least in part, in the form of software instructions 172 of FIG. 1, stored on non-transitory, tangible, machine-readable media (e.g., memory 170 of FIG. 1) that when run by one or more processors (e.g., one or more processors 120 of FIG. 1) may cause the one or more processors to perform operations described in operations 702-730.

The process 700 starts at operation 702, where the one or more processors 120 obtain current attack vectors 192 from the storage and databases 150. The process 700 continues at operation 710, where the one or more processors 120 determine whether the attack vectors 192 comprise any updates. If the attack vectors 192 do not comprise any updates (e.g., NO), the process 700 continues to operation 730. If the attack vectors 192 comprise one or more updates (e.g., YES), the process 700 proceeds to operation 712. At operation 712, the one or more processors 120 determine vulnerable assets from the current attack vectors 192. At operation 714, the one or more processors 120 implement the attack path visualization engine 270 to split the vulnerable assets into asset groups. At operation 716, the one or more processors 120 generate a visualization interface (e.g., visualization interfaces 400-600) and present the visualization interface in a display or other I/O interface 130 comprising the groups of vulnerable assets. At operation 718, the one or more processors 120 determine the one or more attack paths 155.

The process 700 continues at operation 720, where the one or more processors 120 determine whether filtering is detected to filter the attack paths 155 in the visualization interface. If filtering is not detected to filter the attack paths 155 in the visualization interface (e.g., NO), the process 700 continues to operation 730. If the filtering is detected to filter the attack paths 155 in the visualization interface (e.g., YES), the process 700 proceeds to operation 722. At operation 722, the one or more processors 120 filter assets (e.g., to generate filtered assets 282) in the visualization interface. At operation 724, the one or more processors 120 one or more remediation techniques (e.g., threat remediation parameters 292) for the filtered assets 282. In this regard, the one or more processors 120 may associate the remediation techniques to corresponding vulnerable assets 123 presented in the visualization interface. At operation 726, the one or more processors 120 prioritize threats (e.g., threat visualization parameters 286) and enumerate remediation costs (e.g., threat visualization parameters 292) in the visualization interface. At operation 728, the one or more processors 120 update the visualization interface with the threat visualization parameters 286, the threat prioritization parameters 290, and the threat remediation parameters 292 for each of the vulnerable assets 123 along each attach path 155.

The process 700 ends at operation 730, where the one or more processors 120 present visualization of multiple attack paths 155 in the visualization interface. At this stage, the process 700 provides insights while visualizing threats in a simple and digestible manner at scale (e.g., even within dense application service topologies comprising several assets 123).

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figures above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

The invention claimed is:

1. A system, comprising:
a memory configured to store:
    asset inventory indicating a plurality of application assets;
    a first plurality of attack vector parameters configured to indicate vulnerabilities of one or more of the plurality of application assets; and
    asset mapping information configured to associate each of the plurality of application assets to one or more of a plurality of application layers; and
a processor communicatively coupled to the memory and configured to:
    determine a first plurality of vulnerable assets in the plurality of application assets based at least in part upon the first plurality of attack vector parameters;
    obtain a first plurality of security parameters from a security framework, the first plurality of security parameters indicating one or more attack techniques;
    associate each of the first plurality of vulnerable assets to one or more of the first plurality of security parameters;
    generate a visual interface showing the first plurality of vulnerable assets and the first plurality of security parameters;
    determine a first attack path connecting the first plurality of vulnerable assets based at least in part upon the asset mapping information;
    map the first attack path to the plurality of application layers and the first plurality of security parameters in the visual interface;
    determine a first remediation cost to remove the first plurality of vulnerable assets from the first attack path;
    update the visual interface showing the first remediation cost;
    obtain asset protection information indicating a first risk tolerance level for the first attack path;
    compare the first remediation cost to the first risk tolerance level;
    in response to the first remediation cost being greater than the first risk tolerance level, generate a first plurality of threat prioritization parameters that indicate first corresponding priorities for each vulnerable asset in the first plurality of vulnerable assets;
    generate a first plurality of remediation parameters that indicate a first solution to remediate the first attack path in the system; and
    assign the first plurality of threat prioritization parameters and the first plurality of remediation parameters to the first attack path in the visual interface.

2. The system of claim 1, wherein the processor is further configured to:
    in conjunction with determining the first attack path connecting the first plurality of vulnerable assets, obtain a plurality of user visualization commands from a user device; and
    map the first attack path to the plurality of application layers and the first plurality of security parameters in the visual interface based at least in part upon the plurality of user visualization commands.

3. The system of claim 2, wherein the processor is further configured to:
    obtain a second plurality of attack vector parameters;
    determine a second plurality of vulnerable assets in the plurality of application assets based at least in part upon the second plurality of attack vector parameters;
    obtain a second plurality of security parameters from the security framework;
    associate each of the second plurality of vulnerable assets to one or more of the second plurality of security parameters;
    update the visual interface showing the first plurality of vulnerable assets, the first plurality of security parameters, the second plurality of vulnerable assets, and the second plurality of security parameters;
    determine a second attack path connecting the second plurality of vulnerable assets based at least in part upon the asset mapping information; and
    map the second attack path to the plurality of application layers and the second plurality of security parameters in the visual interface.

4. The system of claim 3, wherein the processor is further configured to:
    in conjunction with determining the second plurality of vulnerable assets, determine a second remediation cost to remove the second plurality of vulnerable assets from the second attack path; and
    update the visual interface showing the second remediation cost.

5. The system of claim 4, wherein the processor is further configured to:
    obtain additional asset protection information indicating a second risk tolerance level for the second attack path;

compare the second remediation cost to second first risk tolerance level;

in response to the second remediation cost being greater than the second risk tolerance level, generate a second plurality of threat prioritization parameters that indicate second corresponding priorities for each vulnerable asset in the second plurality of vulnerable assets;

generate a second plurality of remediation parameters that indicate a second solution to remediate the second attack path in the system; and assign the second plurality of threat prioritization parameters and the second plurality of remediation parameters to the second attack path in the visual interface.

6. The system of claim 1, wherein the processor is further configured to:

generate a first plurality of threat visualization parameters that indicate first corresponding attack types and first corresponding attack severity for each vulnerable asset in the first plurality of vulnerable assets; and assign the first plurality of threat visualization parameters to the first attack path in the visual interface.

7. The system of claim 1, wherein:

the plurality of application layers comprise an application data layer, an application logic layer, an application infrastructure layer, and an application cloud infrastructure layer.

8. The system of claim 1, wherein:

the first plurality of attack vector parameters comprise a comprehensive list of attack vectors.

9. The system of claim 1, wherein:

the first plurality of attack vector parameters comprise information indicating the vulnerabilities and potential intrusions in the plurality of application layers.

10. A method, comprising:

obtaining a plurality of parameters, comprising:

asset inventory indicating a plurality of application assets;

a first plurality of attack vector parameters configured to indicate vulnerabilities of one or more of the plurality of application assets; and asset mapping information configured to associate each of the plurality of application assets to one or more of a plurality of application layers;

determining a first plurality of vulnerable assets in the plurality of application assets based at least in part upon the first plurality of attack vector parameters;

obtaining a first plurality of security parameters from a security framework, the first plurality of security parameters indicating one or more attack techniques;

associating each of the first plurality of vulnerable assets to one or more of the first plurality of security parameters;

generating a visual interface showing the first plurality of vulnerable assets and the first plurality of security parameters;

determining a first attack path connecting the first plurality of vulnerable assets based at least in part upon the asset mapping information;

mapping the first attack path to the plurality of application layers and the first plurality of security parameters in the visual interface;

determining a first remediation cost to remove the first plurality of vulnerable assets from the first attack path;

updating the visual interface showing the first remediation cost;

obtaining asset protection information indicating a first risk tolerance level for the first attack path;

comparing the first remediation cost to the first risk tolerance level;

in response to the first remediation cost being greater than the first risk tolerance level, generating a first plurality of threat prioritization parameters that indicate first corresponding priorities for each vulnerable asset in the first plurality of vulnerable assets;

generating a first plurality of remediation parameters that indicate a first solution to remediate the first attack path; and assigning the first plurality of threat prioritization parameters and the first plurality of remediation parameters to the first attack path in the visual interface.

11. The method of claim 10, further comprising:

in conjunction with determining the first attack path connecting the first plurality of vulnerable assets, obtaining a plurality of user visualization commands from a user device; and mapping the first attack path to the plurality of application layers and the first plurality of security parameters in the visual interface based at least in part upon the plurality of user visualization commands.

12. The method of claim 11, further comprising:

obtaining a second plurality of attack vector parameters;

determining a second plurality of vulnerable assets in the plurality of application assets based at least in part upon the second plurality of attack vector parameters;

obtaining a second plurality of security parameters from the security framework;

associating each of the second plurality of vulnerable assets to one or more of the second plurality of security parameters;

updating the visual interface showing the first plurality of vulnerable assets, the first plurality of security parameters, the second plurality of vulnerable assets, and the second plurality of security parameters;

determining a second attack path connecting the second plurality of vulnerable assets based at least in part upon the asset mapping information; and mapping the second attack path to the plurality of application layers and the second plurality of security parameters in the visual interface.

13. The method of claim 12, further comprising:

in conjunction with determining the second plurality of vulnerable assets, determining a second remediation cost to remove the second plurality of vulnerable assets from the second attack path; and updating the visual interface showing the second remediation cost.

14. The method of claim 13, further comprising:

obtaining additional asset protection information indicating a second risk tolerance level for the second attack path;

comparing the second remediation cost to second first risk tolerance level;

in response to the second remediation cost being greater than the second risk tolerance level, generating a second plurality of threat prioritization parameters that indicate second corresponding priorities for each vulnerable asset in the second plurality of vulnerable assets;

generating a second plurality of remediation parameters that indicate a second solution to remediate the second attack path; and assigning the second plurality of threat prioritization parameters and the second plurality of remediation parameters to the second attack path in the visual interface.

15. The method of claim 10, wherein:

generating a first plurality of threat visualization parameters that indicate first corresponding attack types and first corresponding attack severity for each vulnerable asset in the first plurality of vulnerable assets; and assigning the first plurality of threat visualization parameters to the first attack path in the visual interface.

16. A non-transitory computer readable medium storing instructions that when executed by a processor cause the processor to:

obtain a plurality of parameters, comprising:

asset inventory indicating a plurality of application assets;

a first plurality of attack vector parameters configured to indicate vulnerabilities of one or more of the plurality of application assets; and asset mapping information configured to associate each of the plurality of application assets to one or more of a plurality of application layers;

determine a first plurality of vulnerable assets in the plurality of application assets based at least in part upon the first plurality of attack vector parameters;

obtain a first plurality of security parameters from a security framework, the first plurality of security parameters indicating one or more attack techniques;

associate each of the first plurality of vulnerable assets to one or more of the first plurality of security parameters;

generate a visual interface showing the first plurality of vulnerable assets and the first plurality of security parameters;

determine a first attack path connecting the first plurality of vulnerable assets based at least in part upon the asset mapping information;

map the first attack path to the plurality of application layers and the first plurality of security parameters in the visual interface;

determine a first remediation cost to remove the first plurality of vulnerable assets from the first attack path;

update the visual interface showing the first remediation cost;

obtain asset protection information indicating a first risk tolerance level for the first attack path;

compare the first remediation cost to the first risk tolerance level;

in response to the first remediation cost being greater than the first risk tolerance level, generate a first plurality of threat prioritization parameters that indicate first corresponding priorities for each vulnerable asset in the first plurality of vulnerable assets;

generate a first plurality of remediation parameters that indicate a first solution to remediate the first attack path; and assign the first plurality of threat prioritization parameters and the first plurality of remediation parameters to the first attack path in the visual interface.

17. The non-transitory computer readable medium of claim 16, wherein the instructions further cause the processor to:

in conjunction with determining the first attack path connecting the first plurality of vulnerable assets, obtain a plurality of user visualization commands from a user device; and map the first attack path to the plurality of application layers and the first plurality of security parameters in the visual interface based at least in part upon the plurality of user visualization commands.

18. The non-transitory computer readable medium of claim 17, wherein the instructions further cause the processor to:

obtain a second plurality of attack vector parameters;

determine a second plurality of vulnerable assets in the plurality of application assets based at least in part upon the second plurality of attack vector parameters;

obtain a second plurality of security parameters from the security framework;

associate each of the second plurality of vulnerable assets to one or more of the second plurality of security parameters;

update the visual interface showing the first plurality of vulnerable assets, the first plurality of security parameters, the second plurality of vulnerable assets, and the second plurality of security parameters;

determine a second attack path connecting the second plurality of vulnerable assets based at least in part upon the asset mapping information; and map the second attack path to the plurality of application layers and the second plurality of security parameters in the visual interface.

19. The non-transitory computer readable medium of claim 18, wherein the instructions further cause the processor to:

in conjunction with determining the second plurality of vulnerable assets, determine a second remediation cost to remove the second plurality of vulnerable assets from the second attack path; and update the visual interface showing the second remediation cost.

20. The non-transitory computer readable medium of claim 19, wherein the instructions further cause the processor to:

obtain additional asset protection information indicating a second risk tolerance level for the second attack path;

compare the second remediation cost to second first risk tolerance level;

in response to the second remediation cost being greater than the second risk tolerance level, generate a second plurality of threat prioritization parameters that indicate second corresponding priorities for each vulnerable asset in the second plurality of vulnerable assets;

generate a second plurality of remediation parameters that indicate a second solution to remediate the second attack path; and assign the second plurality of threat prioritization parameters and the second plurality of remediation parameters to the second attack path in the visual interface.

* * * * *